United States Patent
Banerjee et al.

(10) Patent No.: US 9,278,875 B2
(45) Date of Patent: Mar. 8, 2016

(54) PROCESS FOR REDUCING THE SULFATE CONCENTRATION IN A WASTEWATER STREAM BY EMPLOYING REGENERATED GIBBSITE

(71) Applicant: Veolia Water Solutions & Technologies Support, Saint-Maurice (FR)

(72) Inventors: Kashi Banerjee, Moon Township, PA (US); Charles D. Blumenschein, Pittsburgh, PA (US); John Charles Schrader, Pittsburgh, PA (US); Robert G. Cook, Montgomery, TX (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 128 days.

(21) Appl. No.: 14/087,629

(22) Filed: Nov. 22, 2013

(65) Prior Publication Data

US 2014/0144843 A1    May 29, 2014

Related U.S. Application Data

(60) Provisional application No. 61/730,175, filed on Nov. 27, 2012.

(51) Int. Cl.

| | |
|---|---|
| B01D 21/00 | (2006.01) |
| C02F 1/52 | (2006.01) |
| C02F 1/58 | (2006.01) |
| C02F 101/10 | (2006.01) |
| C02F 103/10 | (2006.01) |

(52) U.S. Cl.
CPC ......... C02F 1/5245 (2013.01); *C02F 2101/101* (2013.01); *C02F 2103/10* (2013.01); *C02F 2303/16* (2013.01)

(58) Field of Classification Search
CPC ............... C02F 1/56; C02F 1/66; C02F 9/00; C02F 1/5236; C02F 1/5281; C02F 1/5245; C02F 2101/101; C02F 2103/10; C02F 2303/16; C22B 3/44; C01F 7/145; C01F 7/47; C01F 7/26; C01F 7/12; C01F 5/30; C01B 25/22; B01D 21/01; B01D 9/00; B01D 21/286; B01D 37/00

USPC ........ 210/665, 667, 681, 683, 702, 704, 705, 210/710, 711, 712, 713, 714, 716, 717, 719, 210/721, 723, 724, 726, 738, 747.7, 747.8, 210/749, 753, 767; 423/122, 128, 129, 158, 423/166

See application file for complete search history.

(56) References Cited

U.S. PATENT DOCUMENTS

| 3,676,079 A * | 7/1972 | Morgan ......................... 423/252 |
| 6,280,630 B1 * | 8/2001 | Ramsay ........................ 210/711 |
| 7,820,057 B2 * | 10/2010 | Verdoes et al. ............... 210/714 |
| 2005/0016919 A1 * | 1/2005 | Hagino et al. ................. 210/613 |
| 2011/0002824 A1 * | 1/2011 | Kouznetsov et al. ......... 423/127 |

FOREIGN PATENT DOCUMENTS

| WO | 9855405 A1 | 12/1998 |
| WO | 2011163451 A1 | 12/2011 |

OTHER PUBLICATIONS

Usinowicz et al., NPL: "; Technical and Economic Evaluation and selection of Sulfate ion Removal Technologies for Recovery of Water", Copyright 2006 Water Environment Foundation.*

* cited by examiner

*Primary Examiner* — Nam Nguyen
*Assistant Examiner* — Claire Norris
(74) *Attorney, Agent, or Firm* — Coats and Bennett PLLC

(57) ABSTRACT

A method for removing sulfate from a wastewater stream includes mixing gibbsite and a calcium source to precipitate Ettringite from the wastewater stream and produce an effluent with a reduced sulfate concentration. The gibbsite in the precipitated Ettringite is regenerated by mixing an acid with the Ettringite and precipitating gibbsite particles, after which the gibbsite particles are subjected to a crystallization process to increase the size of the gibbsite particles which are recycled back to the main stream.

19 Claims, 2 Drawing Sheets

PROCESS FOR REDUCING THE SULFATE CONCENTRATION IN A WASTEWATER STREAM BY EMPLOYING REGENERATED GIBBSITE

This application claims priority under 35 U.S.C. §119(e) from the following U.S. provisional application: Application Ser. No. 61/730,175 filed on Nov. 27, 2012. That application is incorporated in its entirety by reference herein.

FIELD OF THE INVENTION

The present invention relates to a process for reducing sulfate concentration in a wastewater stream.

BACKGROUND OF THE INVENTION

Industrial wastewater generated at steel, mining, plating, oil production and refining operations, and microelectronic industries generally contains high concentrations of sulfate and other contaminants. The promulgation of new regulations often limits the amount of sulfate that can be present in wastewater discharged because of the effects on the environment. Furthermore, wastewater that is not discharged into the environment, but that is reused in other applications, must often be treated to reduce high concentrations of sulfate. Elevated concentrations of sulfate promote scaling on wastewater treatment equipment, reduce the quality of drinking water, and affect the environment. For example, high sulfate concentrations in water can cause the water to have a foul taste and can have a laxative effect in humans and animals. As another example, sulfates are a major dissolved component in rain and can be chemically reduced to form sulfides, which are known to corrode many metals.

SUMMARY OF THE INVENTION

The present invention relates to a method for removing sulfate from a wastewater stream. The method or process entails mixing gibbsite and a calcium source with the wastewater stream to precipitate Ettringite and produce an effluent where the sulfate concentration in the effluent is substantially less than the sulfate concentration in the influent wastewater stream. As a part of the process, gibbsite is regenerated. This is achieved by mixing an acid with the precipitated Ettringite and producing precipitated gibbsite particles. The method or process entails increasing the average size of the precipitated gibbsite particles to at least 25 µm by subjecting the precipitated gibbsite particles to a crystallization process. The gibbsite particles of a size of at least 25 µm are recycled and mixed with the wastewater stream. This process continues and during the course of the process approximately 90-99.5% of the gibbsite utilized to reduce sulfate in the wastewater stream is recovered and reused.

Other objects and advantages of the present invention will become apparent and obvious from a study of the following description and the accompanying drawings which are merely illustrative of such invention.

DESCRIPTION OF THE SYSTEM AND PROCESS FOR REMOVING SULFATE

The present invention is a system and process for removing sulfate from a wastewater stream. Basically, the process entails mixing gibbsite and a calcium source such as lime with an influent wastewater stream. This causes Ettringite to precipitate from the wastewater. Precipitated Ettringite is separated from the wastewater stream by a solids separator, producing a treated effluent that, compared with the influent wastewater stream, includes a relatively low sulfate concentration.

One of the aims of the present invention is to separate gibbsite from the precipitated Ettringite and recycle the separated gibbsite to the mainstream where it can be used over and over again with a calcium source to remove sulfate from the influent wastewater stream.

As discussed below, to separate gibbsite from Ettringite, an acid, such as hydrochloric acid, is mixed with the precipitated Ettringite. Mixing acid with the precipitated Ettringite, causes Ettringite to dissolve and gibbsite to precipitate. A solids separator separates the precipitated gibbsite and leaves a liquid effluent that contains soluble calcium and sulfate ions. A substantial portion of the separated gibbsite is recycled and mixed with the wastewater influent. However, prior to recycling the gibbsite back to the mainstream and mixing the gibbsite with the wastewater influent, the gibbsite is subjected to a crystallization process for the purpose of increasing the size of the separated gibbsite particles. In one embodiment, the separated gibbsite is continuously recycled between a crystallization reactor or unit and a solids separator and, in the process, the average gibbsite particles are increased in size from less than 10 µm to above 25 µm. It was discovered that by producing, on average, gibbsite particles of a size of 25 µm and greater that the gibbsite could be effectively used to substantially reduce sulfate concentrations in the wastewater influent and, further that on an ongoing basis 90% to approximately 99.5% of the gibbsite used in the mainstream to remove sulfate could be regenerated and used time after time in the sulfate reduction process. As discussed below, in one example, it was found that the process described herein reduced the sulfate concentration of 1500 mg/L in the wastewater influent stream to 30 mg/L in the treated effluent stream.

Figure 1:
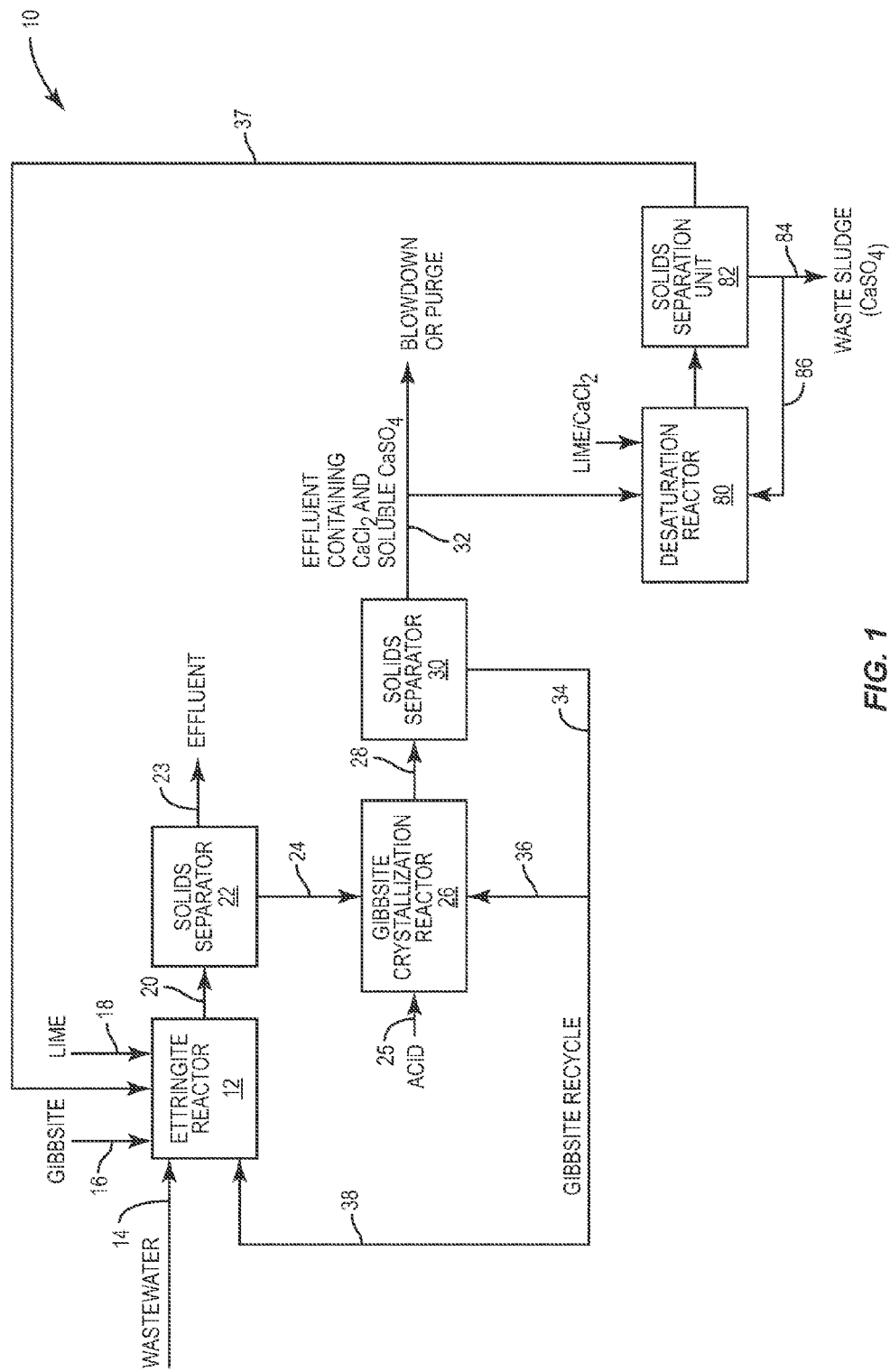
FIG. 1 is a schematic illustration of one embodiment of a process for removing sulfate from a wastewater stream.

Turning to FIG. 1, an exemplary system and process is shown for treating a wastewater stream having a significant sulfate concentration. The system and process is indicated generally by the numeral 10. Included in the system is an Ettringite reactor 12. There are two reagent lines, lines 16 and 18, leading into the Ettringite reactor 12 for the purpose of injecting gibbsite and a calcium source such as lime into the reactor. Downstream of the Ettringite reactor 12 is a solids separator 22. In addition, the system shown in FIG. 1 includes a gibbsite regeneration unit or section. This includes a gibbsite crystallization reactor 26 and a downstream solids separator 30. Note that the crystallization reactor 26 is provided with an acid injection line 25.

A wastewater influent stream having sulfate is directed into the Ettringite reactor 12 via influent line 14. Various wastewater influent streams containing a significant concentration of sulfate can be treated. For example, the process shown in FIG. 1 could be located downstream of a membrane separation unit where the influent stream directed into line 14 is a reject stream produced by the membrane separation unit. Various ranges of sulfate concentration can be found in such wastewater streams. For example, it is not uncommon for the wastewater influent stream to have a sulfate concentration of 1,500 mg/L or higher.

Gibbsite is initially injected into the reactor 12 via line 16. The amount of gibbsite added to the wastewater stream in the Ettringite reactor 12 can vary. In one embodiment, approximately 0.6 lbs. of gibbsite is added per pound of sulfate in the wastewater stream. As will be explained subsequently herein, it is contemplated that all or substantially all of the gibbsite required to operate the process of the present invention will be recovered in a sidestream gibbsite regeneration process and recycled back to the mainstream. In any event, a calcium source such as lime is also injected into the Ettringite reactor 12. The Ettringite reactor 12, in one embodiment, may be of the type promoted by Veolia Water under the "TurboMix" mark which generally comprises a vertical tube having a mixer therein. In other embodiments, the reactor may be a conventional reactor such as a completely mixed reactor or a continuous flow stirred reactor tank.

In the embodiments illustrated in the drawings, the gibbsite and lime are injected into the Ettringite reactor 12. It is appreciated that in an alternate embodiment, there is provided a mixing tank upstream of the Ettringite reactor. In this embodiment, the gibbsite and lime are injected into the mixing tank upstream of the Ettringite reactor 12 and the gibbsite and lime is mixed with the wastewater in the mixing tank. It should also be noted, that the gibbsite recycle line 38, discussed below, in the particular embodiment would be returned to the mixing tank that receives the gibbsite and lime.

Mixing gibbsite and lime with the wastewater causes Ettringite (calcium sulfoaluminate) to precipitate. The contents of the Ettringite reactor 12 are directed via line 20 to the solids separator 22 which could comprise any conventional solids separator such as a clarifier, lamella separator, membrane separation unit, etc. Precipitated Ettringite is removed from the mainstream as sludge. The supernatant from the solids separator 22 is directed into effluent line 23 which conveys the treated effluent. The precipitation of Ettringite removes sulfate from the wastewater stream. As noted above in one test, the wastewater influent included a sulfate concentration of approximately 1,500 mg/L while the treated effluent stream, included a sulfate concentration of 30 mg/L.

Sludge produced by the solids separator 22 includes the precipitated Ettringite. This sludge including the precipitated Ettringite is directed to a gibbsite regeneration unit or process which is carried out in a sidestream. In the embodiment shown in FIG. 1, the sludge is directed to a gibbsite crystallization reactor 26. An acid, such as hydrochloric acid, is directed through line 25 into the gibbsite crystallization reactor and is mixed with the sludge including the precipitated Ettringite. Under these conditions, the calcium sulfoaluminate precipitants in the sludge dissolve and gibbsite (aluminum hydroxide) precipitates. The sludge, which can be super saturated in dissolved calcium sulfoaluminate and include calcium chloride, along with the aluminum hydroxide precipitants, is directed from the crystallization reactor via line 28 to a solids separator 30, such as a clarifier or other conventional separating devices. Here the gibbsite or aluminum hydroxide is separated from an effluent. The supernatant from the solids separator is directed into effluent line 32 which, in this example, contains calcium chloride and soluble calcium sulfate. The supernatant or effluent in line 32 is, in one embodiment, split into two streams, one stream 37 is returned to the Ettringite reactor 12 while another stream is wasted. Gibbsite, on the other hand, is recycled via lines 34 and 36 back to the gibbsite crystallization reactor 26. The gibbsite crystallization process entails continuously recycling precipitated gibbsite particles back and forth between the crystallization reactor 26 and the solids separator 30. A portion of the gibbsite being recycled in line 34 can be wasted. This is an optional step as in some embodiments it will be unnecessary to waste a portion of the gibbsite being recycled.

The purpose of this crystallization process is to grow or increase the size of the gibbsite particles. In tests conducted, it was found that typically the gibbsite particles initially precipitated from Ettringite were on the order of 10 $\mu$m. In these tests, it was found that these relatively small gibbsite particles were not effective in terms of removing sulfate from the wastewater influent. It was found, however, that the effectiveness and efficiency of the sulfate reduction process could be greatly enhanced if it were possible to grow the gibbsite particles such that, on average, their size was at least 25 $\mu$m and higher. Thus, the present invention envisions a crystallization process where the precipitated gibbsite particles are continuously recycled and subjected to a crystallization process to where the particles grow in size such that over 50% of the particles have a diameter or large dimension greater than 25 $\mu$m. Preferably, the average size of 50% or more of the gibbsite particles is on the order of 30-35 $\mu$m and higher.

The recycle rate should be controlled to maintain a mass ratio between approximately 5:1 and 20:1, where the mass ratio is the weight of the gibbsite in the recycled sludge compared to the weight of newly precipitated gibbsite particles generated in the crystallization reactor. That is, on a weight basis, the recycle rate of the gibbsite particles is such that there is approximately 5-20 times the amount of gibbsite being recycled as being precipitated at any one time. The mass ratio can be adjusted to account for constantly changing variables in the process such as, for example, the feedwater quality, temperature, ionic strength, and effluent water quality.

As seen in FIG. 1, the crystallized gibbsite particle, once they are of a particle size of 25 $\mu$m or higher, are recycled back to the Ettringite reactor 12 where the gibbsite is utilized with lime in the mainstream to precipitate Ettringite. It is contemplated that as much as 90% of the gibbsite will be recovered and recycled via this process. In some applications, it has been found that a 99% recovery can be achieved. In the latter case, it follows that very little gibbsite is required to be added to the process.

It should be noted that coagulants and/or flocculants can be added to the Ettringite reactor 12 and the gibbsite crystallization reactor 26 to facilitate precipitation and the separation of the precipitants from the aqueous solutions.

As noted above, the effluent in line 32 can be split into two streams, a recycle stream that is directed back to the Ettringite reactor 12 and a blowdown or purge stream. This approach may be appropriate in some embodiments. In other embodiments, it may be beneficial to control sulfate buildup in the recycle line back to the Ettringite reactor 12. In this case, it may be beneficial to precipitate calcium sulfate from the effluent stream leaving the solids separator 30. FIG. 1 shows a process for accomplishing the reduction of sulfate in the recycle line back to the Ettringite reactor. Again, the effluent stream from the solids reactor is split into two streams, a blowdown or purge stream and a stream that leads to a desaturation reactor 80. At the desaturation reactor 80, lime or calcium chloride is added to the effluent from the solids separator 30. As noted before, the effluent in this line contains calcium chloride and soluble calcium sulfate. The addition of lime or calcium chloride will precipitate calcium sulfate in the desaturation reactor 80. The contents of the desaturation reactor 80 is directed to the solids separation unit 82. Here waste sludge is separated from supernatant. The waste sludge containing calcium sulfate is directed into line 84 which can be utilized to waste a portion of the sludge including the calcium sulfate. Other portions of the sludge is recycled via line 86 back to the desaturation reactor 80. The supernatant from the solids separation unit 82 is recycled via line 37 back to the Ettringite reactor 12.

Figure 2:
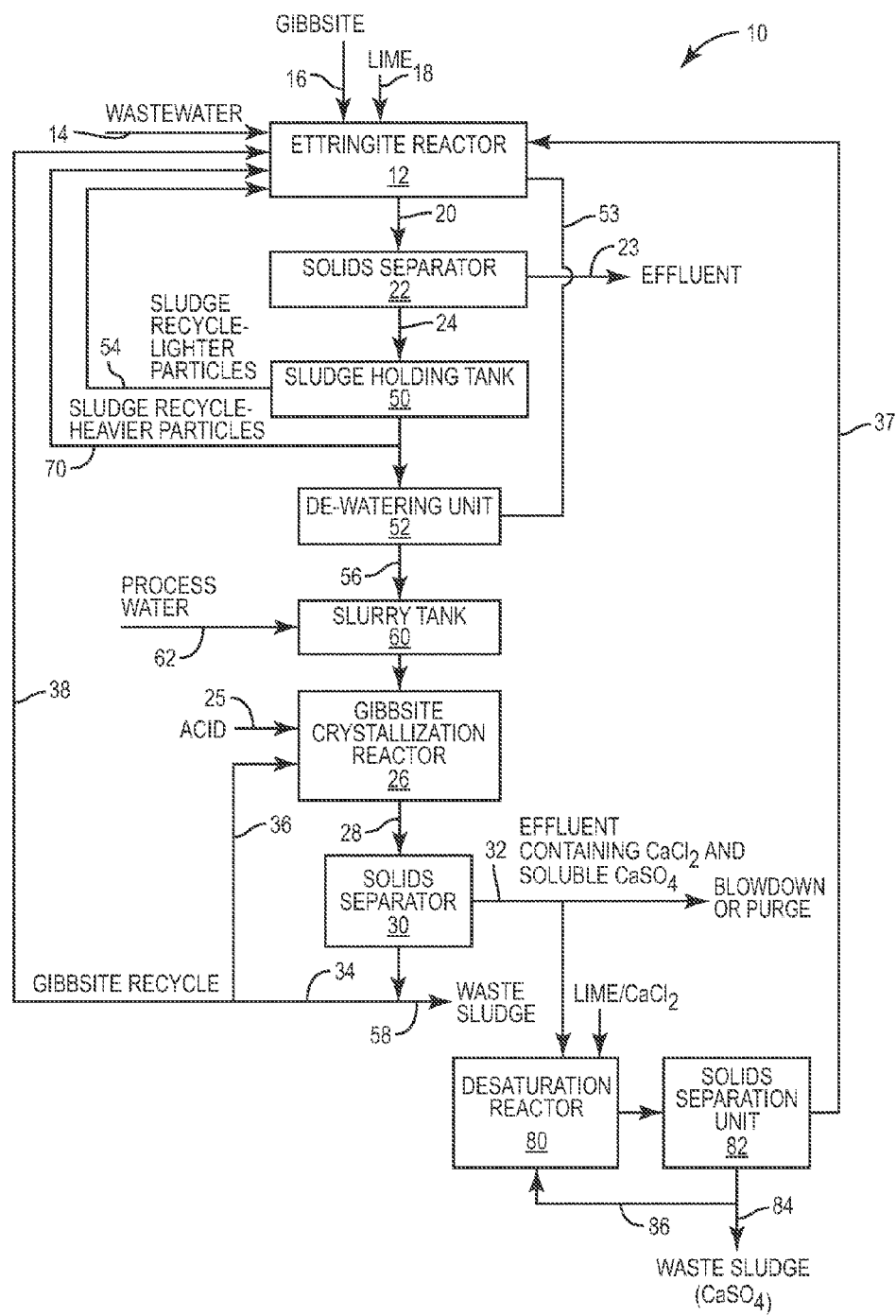
FIG. 2 is a schematic illustration showing another embodiment for removing sulfate from a wastewater stream.

Turning to FIG. 2, another embodiment of the present invention is shown. Here the process for removing sulfate from the wastewater stream is similar to that shown in FIG. 1 and described above. The basic differences lie in the treatment of Ettringite sludge prior to regenerating gibbsite. More particularly, and with reference to FIG. 2, the Ettringite sludge produced by the solids separator 22 is directed to a sludge holding tank 50. As an option, some of the lighter sludge particles can be recycled through line 54 to the Ettringite reactor 12. A second recycle line 70 is also provided. As an option, some of the heavier sludge particles can be recycled via line 70 to Ettringite reactor 12. A substantial portion of the Ettringite sludge held in the sludge holding tank 50 is directed to a de-watering unit 52. There the Ettringite sludge is de-watered. The de-watering process produces a slurry and a filtrate (typically containing calcium) that is recycled via line 53 back to the Ettringite reactor 12. A portion of the filtrate could be sent to blowdown. The Ettringite slurry produced by the de-watering unit 52 is directed through line 56 to a slurry tank 60. As seen in FIG. 2, process water is directed through line 62 into the slurry tank 60 and mixed with the slurry containing the Ettringite sludge. The amount of process water directed into the slurry tank 60 is approximately the same amount of filtrate removed from the Ettringite sludge in the de-watering unit 52. It should be noted that the purpose of the de-watering process is to remove the highly alkaline aqueous solution and replace it with a solution that is at a near pH. This reduces the amount of acid required to precipitate the gibbsite. In one embodiment, the pH of the slurry contained in the slurry tank 60 is maintained at approximately 6.0 to approximately 6.5.

The slurry containing the Ettringite sludge in the slurry tank 60 is pumped to the gibbsite regeneration system discussed above. More particularly, the slurry contained in the slurry tank 60 is directed into the gibbsite crystallization reactor 26 and an acid such as hydrochloric acid is added and mixed with the slurry. Other acids, such as sulfuric acid, can be added to the Ettringite slurry in slurry tank 60. As discussed above, this causes the gibbsite to precipitate. The contents of the crystallization reactor 26 are directed via line 28 to the solids separator 30. There the gibbsite precipitants are separated from the slurry and, as discussed above, the precipitated gibbsite is recycled back and forth between the crystallization reactor 26 and the solids separator 30 to grow gibbsite crystals and particularly to grow them such that they are of an average size of 25 µm and larger. The term "average size" as used herein means that 50% or more of the gibbsite particles are of a 25 µm or larger. These relatively large gibbsite particles are then recycled to the Ettringite reactor 12 via line 38 and used in the mainstream of the process to remove sulfate from the wastewater stream. The effluent produced by solid separator 30 is directed from the solids separator via line 32. This effluent contains calcium chloride and soluble calcium sulfate. The effluent in line 32 can be split into two streams, one stream 37 is returned to the Ettringite reactor 12 while another portion of the effluent from the solids separator 30 is directed to blowdown. As shown in FIG. 2, a portion of the gibbsite being recycled in line 34 can be wasted. However, in some embodiments or some applications, it may be unnecessary to waste the gibbsite sludge being recycled. As noted in the discussion of the FIG. 1 embodiment, it may be necessary in some embodiments or applications to control sulfate buildup in the recycle line back to the Ettringite reactor 12 by precipitating calcium sulfate. Again, this can be achieved, as shown in FIG. 1 and as discussed above, by employing the desaturation reactor 80 and the solids separation unit 82. This process, by adding lime or calcium chloride to the effluent stream from the solids separator 30 will precipitate calcium sulfate which can be removed from the process.

Although the present processes have been shown and described in considerable detail with respect to a few particularly exemplary embodiments, it should be understood by those skilled in the art that it is not intended to limit the process to the embodiments since various modifications, omissions, and additions may be added to the disclosed embodiments without materially departing from the novel teachings and advantages of the processes, particularly in light of the foregoing teachings.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for removing sulfate from a wastewater stream, comprising:
   (a) mixing gibbsite and a calcium source with the wastewater stream to precipitate ettringite and produce an effluent, wherein the sulfate concentration in the effluent is substantially less than the sulfate concentration in the wastewater stream;
   (b) regenerating gibbsite by:
      i. mixing an acid with ettringite and precipitating gibbsite particles;
      ii. increasing the average size of the precipitated gibbsite particles to at least 25 µm by subjecting the precipitated gibbsite particles to a crystallization process; and
   (c) recycling the regenerated gibbsite having an average particle size of at least 25 µm by mixing the regenerated gibbsite with the wastewater stream.

2. The method of claim 1, further comprising dewatering the ettringite and then mixing the ettringite with water at a neutral or near neutral pH to form an ettringite slurry prior to regenerating the gibbsite.

3. The method of claim 1, wherein the calcium source is lime.

4. The method of claim 1, wherein regenerating the gibbsite by mixing the ettringite with an acid occurs at a pH of approximately 6.5 and wherein the acid is hydrochloric acid.

5. The method of claim 2, wherein dewatering the ettringite produces a filtrate and the method further includes recycling at least a portion of the filtrate to an ettringite reactor where the gibbsite and calcium source are mixed with the wastewater stream.

6. The method of claim 1, wherein the crystallization process comprises continuously recycling at least a portion of the precipitated gibbsite particles back and forth between a gibbsite crystallization reactor and a solids separator.

7. The method of claim 1, wherein the acid is hydrochloric acid.

8. The method of claim 1 further including:
   wherein the ettringite precipitated is contained within sludge;
   directing the sludge to a side stream process;

mixing the acid with the sludge containing the ettringite;
dissolving the ettringite in the sludge and precipitating the gibbsite in the sludge;
directing the sludge containing the precipitated gibbsite particles to a solids-liquid separator and separating the gibbsite from a second effluent; and
subjecting the precipitated gibbsite particles to the crystallization process.

9. The method of claim 8, wherein calcium chloride and calcium sulfate are present in the sludge and the calcium chloride and calcium sulfate are contained in the second effluent after the gibbsite is separated.

10. The method of claim 8 including splitting the second effluent into first and second streams and directing the first stream to an ettringite reactor and mixing the first stream with the gibbsite and the calcium source in the ettringite reactor; and wasting the second stream.

11. The method of claim 1 including controlling the recycle rate of the regenerated gibbsite to maintain a mass ratio between approximately 5:1 and 20:1 where the mass ratio is the weight of the regenerated gibbsite particles compared to the weight of newly precipitated gibbsite particles.

12. The method of claim 10 including precipitating calcium sulfate from the first stream of the second effluent before the first stream is mixed with the wastewater stream and gibbsite.

13. A method of removing sulfate from a wastewater stream including:
mixing gibbsite and a calcium source with the wastewater stream and producing an ettringite sludge including precipitated ettringite and producing an effluent having a sulfate concentration substantially less than the sulfate concentration in the wastewater stream;
dewatering the ettringite sludge to produce a filtrate and an ettringite slurry;
after dewatering, the ettringite sludge, mixing water with the ettringite slurry to form an ettringite slurry-water mixture;
after mixing the water with the ettringite slurry, mixing an acid with the ettringite slurry-water mixture to lower the pH of the ettringite slurry-water mixture and causing gibbsite particles to precipitate from the ettringite slurry-water mixture;
separating the precipitated gibbsite particles from the ettringite slurry-water mixture;
increasing the average size of the precipitated gibbsite particles to at least 25 µm by subjecting the precipitated gibbsite particles to a crystallization process; and
recycling the gibbsite particles having an average particle size of at least 25 µm and mixing the gibbsite particles with the wastewater stream.

14. The method of claim 13 including directing the ettringite slurry-water mixture to a gibbsite crystallization reactor and precipitating the gibbsite particles in the gibbsite crystallization reactor; directing the ettringite slurry-water mixture to a solids-liquid separator and separating the precipitated gibbsite particles; recycling the precipitated gibbsite particles back and forth between the gibbsite crystallization reactor and the solids-liquid separator thereby increasing the average size of the precipitated gibbsite particles to at least 25 µm.

15. The method of claim 14 including mixing the filtrate produced in dewatering the ettringite sludge with the wastewater stream, the calcium source and regenerated gibbsite particles.

16. The method of claim 15 wherein the solids-liquid separator produces a second effluent that includes calcium chloride and soluble calcium sulfate.

17. The method of claim 16 including directing the second effluent containing the calcium chloride and soluble calcium sulfate to a desaturation reactor; mixing a second calcium source with the second effluent in the desaturation reactor and precipitating calcium sulfate in the desaturation reactor.

18. The method of claim 17 including directing the second effluent with the precipitated calcium sulfate from the desaturation reactor to a second solids-liquid separation unit and separating calcium sulfate from the second effluent and producing a third effluent that is recycled back and mixed with the wastewater stream.

19. The method of claim 1 wherein the ettringite forms a part of an ettringite sludge and the method includes:
separating the ettringite sludge from the wastewater stream in a solids-liquid separator and producing the effluent that includes a sulfate concentration that is substantially less than the sulfate concentration in the wastewater stream;
dewatering the ettringite sludge to produce a filtrate and an ettringite slurry;
after dewatering the ettringite slurry, mixing process water with the ettringite slurry where the process water has a neutral or near neutral pH;
after mixing the process water with the ettringite slurry, mixing hydrochloric acid with the ettringite slurry to lower the pH of the ettringite slurry;
after mixing the hydrochloric acid with the ettringite slurry, precipitating gibbsite particles from the ettringite slurry;
subjecting the gibbsite particles to a crystallization process and increasing the size of the precipitated gibbsite particles to at least 25 µm; and
recycling the regenerated gibbsite particles having an average particle size of at least 25 µm and mixing the regenerated gibbsite particles with the wastewater stream.

* * * * *